July 27, 1926.
I. T. LATTIN
1,594,305
TOWING DEVICE
Filed May 4, 1925
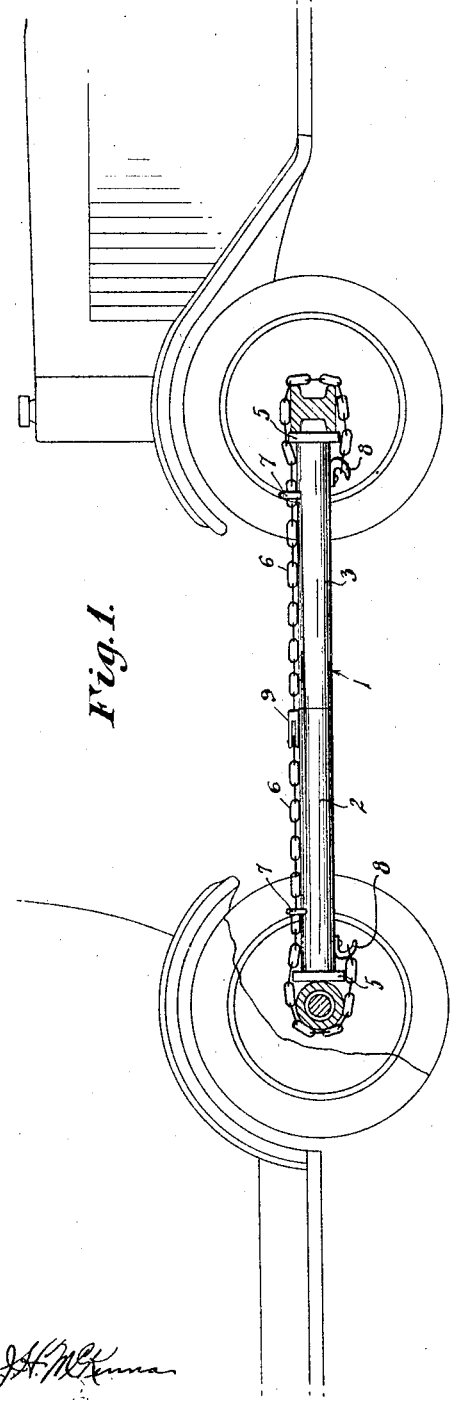
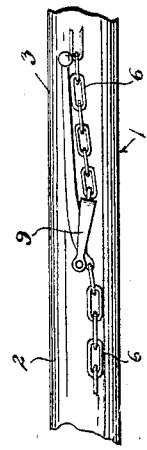
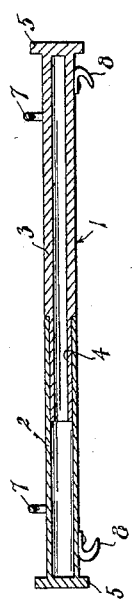
Isaac T. Lattin,
INVENTOR
BY Victor J. Evans,
ATTORNEY
WITNESS:

Patented July 27, 1926.

1,594,305

UNITED STATES PATENT OFFICE.

ISAAC T. LATTIN, OF GREAT FALLS, MONTANA.

TOWING DEVICE.

Application filed May 4, 1925. Serial No. 27,944.

This invention relates to a towing device, the general object of the invention being to provide means whereby one vehicle can tow another.

Another object of the invention is to provide an adjustable bar for engaging the axles of two vehicles with a chain for connecting the bar to the axles.

This invention also consists in certain other features of construction and in the combination and arrangement of the several parts, to be hereinafter fully described, illustrated in the accompanying drawings and pointed out in the appended claim.

In describing my invention in detail, reference will be had to the accompanying drawings wherein like characters denote like or corresponding parts throughout the several views, and in which:

Figure 1 is a view showing the invention in use.

Figure 2 is a sectional view through the bar.

Figure 3 is a detailed view.

In these views 1 indicates a bar which is shown as consisting of two sections 2 and 3, the reduced end 4 of one section fitting in the other section. It will be understood, however, that the bar may be composed of any number of sections so that it can be adjusted as to length to suit the vehicles on which it is being used. The ends of the bar are provided with heads 5 for engaging the front and rear axles of the vehicles, as shown in Figure 1. The bar is supported on the axles by means of a pair of chains 6, each chain passing through a loop 7 on its section and having its end engaging a hook 8 after a portion of the chain has been passed around the axle. The two chains are connected together by a tightener device 9 which may be of any suitable construction. This device will tighten the chains after they have been put in the position shown in Figure 1, so that the bar is fastened to the axles and thus one vehicle can pull another.

This device will make a rigid connection between the cars so that the towed car need not be steered and by making the parts detachable the device can be carried in the tool box or under the seat of a vehicle.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having thus described the invention, what is claimed as new, is:—

A towing device comprising a sectional bar having a head at each end thereof, one section having a reduced inner end fitting in a socket in the other section, loops on the bar, a chain held to the bar by being passed through said loops, hooks on the bar adjacent the heads for receiving the ends of the chain after the same has been passed around the axles of two vehicles and a chain tightener on the bar.

In testimony whereof I affix my signature.

ISAAC T. LATTIN.